Oct. 15, 1968  H. D. COBURN ET AL  3,405,780
CARRIER AND POSITIONING MECHANISM FOR
A SEISMIC ENERGY SOURCE
Filed May 12, 1967  2 Sheets-Sheet 1
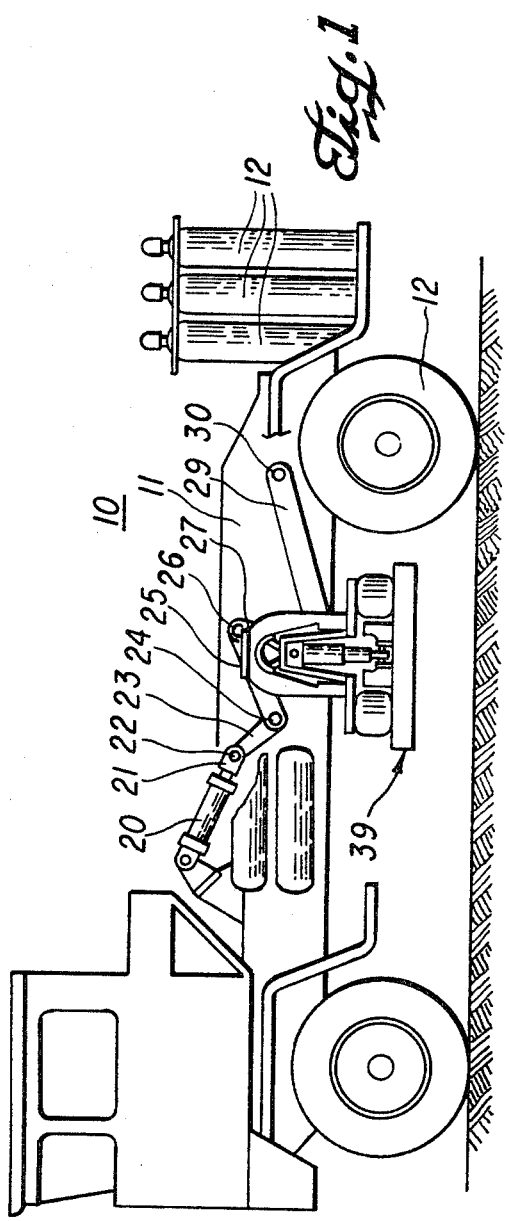
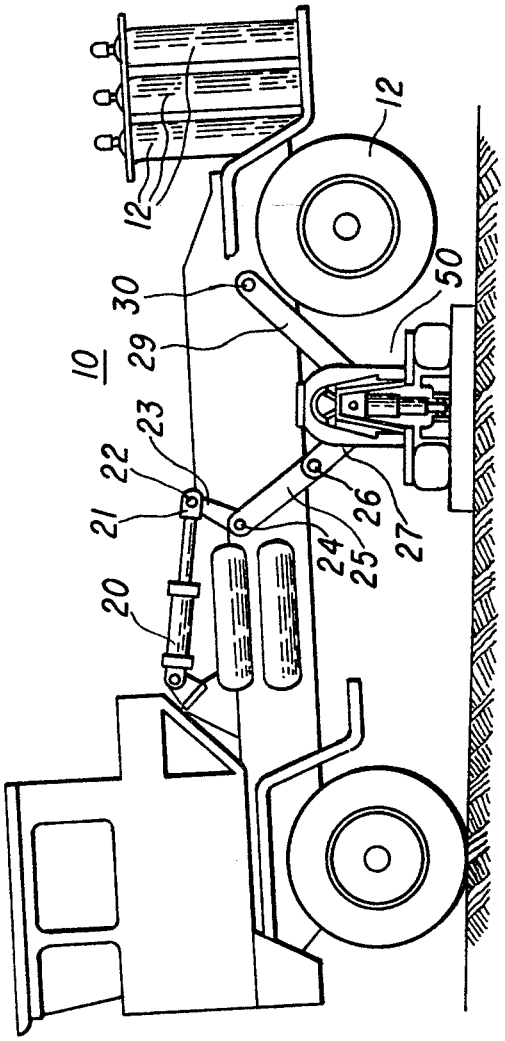
INVENTORS
Herbert Dightman Coburn
Edward Phillip Shear
Carl Edmond Steele
BY John E. Vandigriff
ATTORNEY

3,405,780
CARRIER AND POSITIONING MECHANISM FOR A SEISMIC ENERGY SOURCE
Herbert Dightman Coburn, Dallas, Tex., and Edward Phillip Shear and Carl Edmond Steele, Tulsa, Okla., assignors of one-half each to Champion Carriers Incorporated, Tulsa, Okla., and Texas Instruments Incorporated, Dallas, Tex., a corporation of Delaware
Filed May 12, 1967, Ser. No. 637,956
2 Claims. (Cl. 181—.5)

ABSTRACT OF THE DISCLOSURE

Disclosed is an apparatus for positioning a seismic energy source used in combination with a mobile vehicle so that when a hydraulic mechanism actuates lever arms the energy source is lowered to the surface of the earth raising the end of the vehicle to cause the weight of the vehicle to be applied in holding the energy source against the surface of the earth.

---

This invention relates to seismic surveying and more particularly to a carrier and positioning mechanism for a seismic surface energy source.

In seismic surveying, arrays of seismometers are placed in defined patterns over the surface of the earth. Seismic disturbances are then caused by the emission of energy causing shock waves to travel through the earth, portions of which are reflected from the substrata back to the seismometers to indicate changes in the subsurface structure of the earth. One method of creating the seismic disturbance is to place a charge of an explosive, for example, dynamite, within a hole or on the surface of the earth and then explode the dynamite to cause the seismic disturbance. This type of energy source and method of causing shock waves is not only dangerous to handle but time consuming because the explosive charge has to be carefully placed and then the area around the charge cleared before it is detonated. An additional disadvantage is that the explosive charge may cause damage in the vicinity in which it is used.

Non-dynamite sources have been used which are placed on the surface of the earth and then caused to vibrate or explode internally, imparting an impulse to the earth. These energy sources are usually not easily moved from place to place in rapid time because of their size and pressure must be exerted to hold them in contact with the earth. An advantage is gained however from using a non-dynamite source in that they are reusable time after time and do not cause damage to the surface of the earth in the vicinity in which they are used. It is therefore one object of this invention to provide a means for rapid movement of non-dynamite sources.

Another object of this invention is to provide a retracting and lift mechanism in conjunction with a carrier for holding the energy source against the earth to cause a seismic disturbance and then to lift the energy source away from the surface of the earth for rapid transportation to the next location.

Still another object of the invention is to provide a carrier for non-dynamite seismic source which is highly mobile and can move over various terrains while using the source and then be moveable over highways to move the source from one location to another.

One feature of this invention is a retracting mechanism attached to a carrier for lowering a non-dynamite energy source against the earth and then raising and moving it to another location in as short a time as possible.

Other objects and features of the invention will become more readily understood from the following detained description and appended claims when read in conjunction with the accompanying drawings in which like reference numerals designate like parts throughout the figures thereof and in which:

FIGURE 1 shows a carrier for a non-dynamite seismic source and a retracting mechanism holding the source in a raised position, for example, when the carrier is traveling from one location to another;

FIGURE 2 shows the carrier of FIGURE 1 with the seismic energy source pressed against the ground by extending the positioning mechanism;

Referring now to FIGURES 1 and 2 there is shown a carrier having a positioning mechanism thereon for holding a seismic energy source against the earth while generating a seismic disturbance. In FIGURE 1, the energy source is shown attached to the center portion of carrier 10 in a retracted position. In the retracted position the energy source 39 is raised so that the carrier may move from place to place without danger of damaging the energy source from brush and rocks. In making seismic surveys it is necessary that the energy source be lowered to the ground and the rear wheels 12 of the carrier be raised so that the weight of the carrier holds the energy source against the surface of the earth. After a shot, the carrier and energy source are moved to another location, for example, during seismic surveying the energy source must be raised, the carrier moved about 50 feet and the energy source lowered, all within about a 15-second time period.

Figure 3:
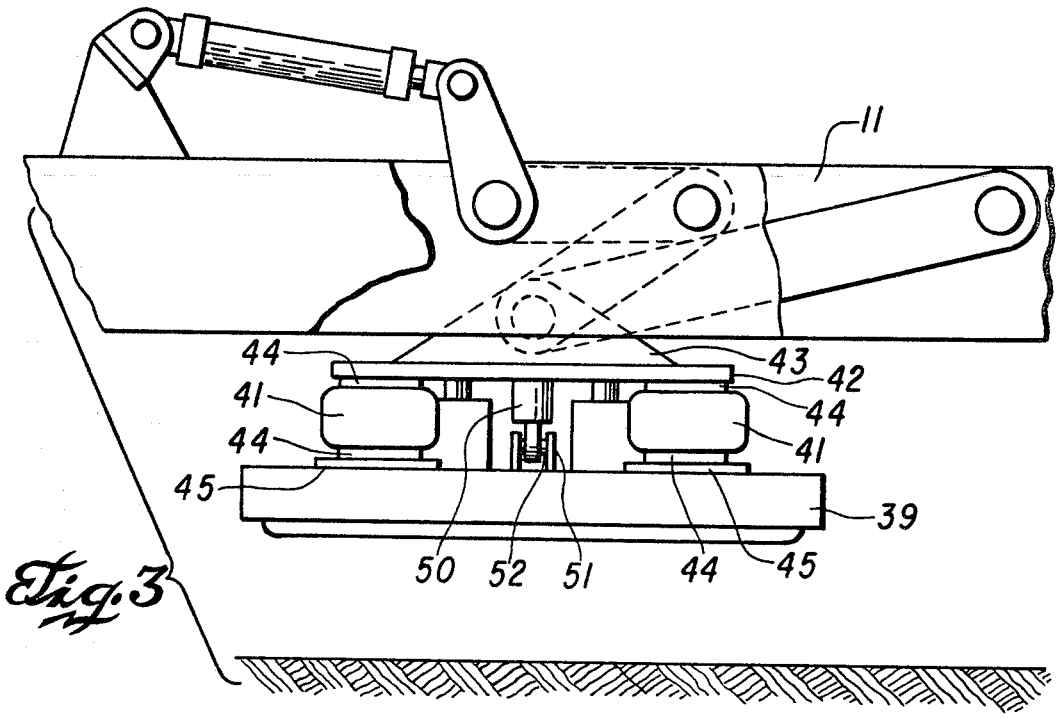
FIGURE 3 shows a fragmented view of the energy source and mechanism while retracted.
Figure 4:
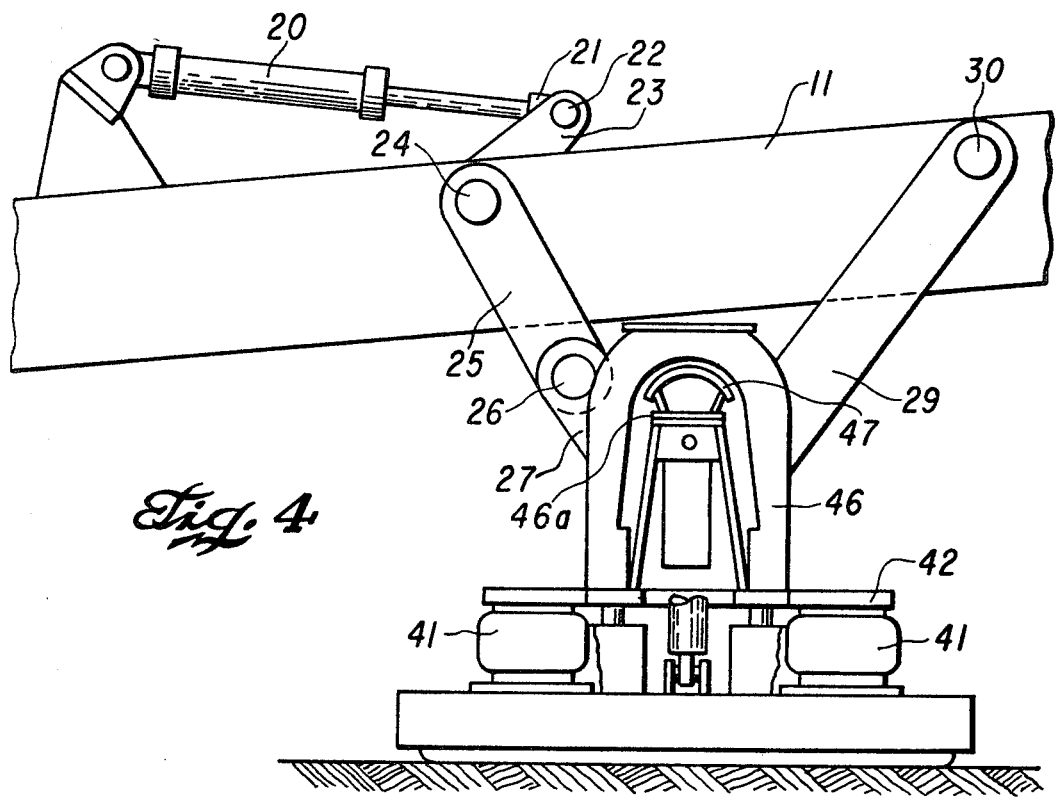
FIGURE 4 shows a fragmented view of the energy source and mechanism while extended to position the seismic source against the earth.

The operation of the positioning mechanism is as follows:

Hydraulic cylinder 20 is the power source for the mechanism. The piston 21 of cylinder 20 is coupled to lever arm 23 by a pin 22. Lever arm 23 is securely attached to shaft 24 which extends through both sides of the frame of the carrier. The positioning mechanism has two parts, one on either side of the carrier which are attached to the energy source. Upon actuation of the hydraulic cylinder 20, shaft 24 is rotated causing lever arm 25 to rotate clockwise downward (as viewed in FIGURE 4). Attached to the lower end of arm 25 is lever arm 27 which is coupled to arm 25 by pin 26. Both levers 25 and 27 rotate about pin 26. The lower end of lever 27 is attached to flange 43 on the mounting plate 42 as illustrated in FIGURES 3 and 4. Also attached to flange 43 is lever 29 which is secured to flange 43 by pin 28. The upper end of lever 29 is secured to the frame 11 of the carrier by pin 30. Lever 29 rotates about pins 30 and 28. The energy source 39 is connected to mounting plate 42 through air bags 41 and shock absorbers 50. Air bags 41 are made of a flexible material, for example, rubber, and have air therein to inflate the bags when the positioning mechanism is in a lowered position and are deflated when in a raised position. The air bags are attached by plate 44 to mounting plate 42 and through plates 44 and 45 to the energy source. The shock absorber 50 is attached at its upper end to a portion 46a of the frame 46 and its lower end it attached to the energy source by bracket 51 and pin 52. There is a rubber pad 47 on the frame 46a to which shock absorber 50 is attached. This is to prevent frame portion 46a from striking frame 46.

In operation the energy source 39 is held against the surface of the earth by the weight of carrier 10. When the energy source is fired, for example, by igniting gas within the source from bottles 12 mounted on the rear end of the carrier, the energy pulse resulting from ignition of the gas will be transmitted through the earth. Air bags 41 and shock absorbers 50 will greatly reduce the coupling of the energy pulse into the carrier.

One feature of the positioning mechanism is that in the lowered position the center point of pin 26 is slightly to the left of a line drawn between the center point of pin 24 and pin 28, as viewed in FIGURE 4. This causes the positioning mechanism to lock into position while the carrier is raised so that the impulse from the energy source will not cause the positioning mechanism to release thereby lowering the carrier. After firing the energy source, the hydraulic cylinder 20 is actuated thereby rotating lever 23 in a counterclockwise direction, as viewed in FIGURE 4, rotating shaft 24 and lever 25. Lever 25 rotates also in a counterclockwise position pulling the center point of pin 26 to the right of the line drawn through the center points of pins 24 and 28, thereby unlocking the mechanism allowing the energy source to be raised as shown in FIGURE 3.

It is desired that the pressure exerted on the transmission pan of the energy source while against the surface of the earth be at least 20,000 pounds for the source to be effective.

In the figures the positioning mechanism is shown extending down one side of the carrier to the energy source. There is a second and parallel set of linkage on the opposite side of the carrier for positioning the energy source. Lever 23 is positioned in the center of shaft 24 so that a rotating force is supplied equally to each side of the positioning mechanism whereby the energy source is lowered uniformly to the surface of the earth and the vehicle raised uniformly without tilting it to one side or the other.

Although the present invention has been described and illustrated in terms of a specific preferred embodiment, it will be apparent that changes and modifications are possible without departing from the spirit and scope of the invention as defined in the appended claims.

What is claimed is:

1. A carrier and apparatus for positioning a seismic energy source comprising a mobile vehicle, a hydraulic cylinder mounted on the frame of said vehicle, a shaft rotatably mounted through said frame, a lever arm connected by one end to said hydraulic cylinder and to said shaft at the other end, a first pair of levers each connected to a different end of said shaft, a second pair of levers rotatably connected to a different one of said first pairs of levers, a mounting plate connected to said second pair of levers, a third pair of levers connected at the ends thereof to said mounting plate and the other ends connected to the frame of said vehicle, and a plurality of shock absorbers connecting said energy source to said mounting plate.

2. An apparatus as defined in claim 1 wherein each one of said first pair of levers is coupled to a different one of said second pair of levers by a pin and said levers when extended lock said energy source in a lowered position.

References Cited

UNITED STATES PATENTS

| | | | |
|---|---|---|---|
| 2,938,438 | 5/1960 | Hamilton | 94—48 |
| 3,282,372 | 11/1966 | Brown et al. | |
| 3,295,630 | 1/1967 | Kilmer. | |

BENJAMIN A. BORCHELT, *Primary Examiner.*

G. H. GLANZMAN, *Assistant Examiner.*